United States Patent [19]

Kobayashi

[11] Patent Number: 5,136,151
[45] Date of Patent: Aug. 4, 1992

[54] COMPACT IMAGE READING APPARATUS WITH CIRCUIT PLATE IN RAISED PORTION OF CASING

[75] Inventor: Hiroyuki Kobayashi, Kofu, Japan
[73] Assignee: Nisca Corporation, Yamanashi, Japan
[21] Appl. No.: 628,152
[22] Filed: Dec. 17, 1990
[30] Foreign Application Priority Data
  Dec. 19, 1989 [JP] Japan .................. 1-146402
[51] Int. Cl.⁵ .............. H01J 40/14; G06K 9/22
[52] U.S. Cl. .................. 250/208.1; 250/221; 382/59
[58] Field of Search .............. 382/59, 65, 67; 250/208.1, 221; 358/473

[56] References Cited

U.S. PATENT DOCUMENTS

| 4,639,790 | 1/1987 | Kusaka | 382/59 |
| 4,847,484 | 7/1989 | Kikuchi | 250/221 |
| 4,862,512 | 8/1989 | Hidaka et al. | 382/59 |

FOREIGN PATENT DOCUMENTS 0072083  4/1987  Japan .................. 382/59

Primary Examiner—David C. Nelms
Assistant Examiner—Michael Messinger
Attorney, Agent, or Firm—Kanesaka and Takeuchi

[57] ABSTRACT

An image reading apparatus of the invention is designed to read an image on a manuscript. The manuscript may be located under or above the image reading apparatus. The image reading apparatus comprises a casing, a reading mechanism situated inside the casing, an actuating mechanism situated inside the casing for moving the reading mechanism, and a circuit mechanism for controlling the reading mechanism and the actuating mechanism. The casing has a reading window formed inside an upper or bottom portion of the casing. An image to be read is placed adjacent to the reading window, and the reading mechanism reads the image through the reading window. The circuit mechanism is provided with at least one circuit plate, which is located at one side of the casing above or below a moving area of the reading mechanism. Accordingly, the size of the image reading apparatus is minimized. A grip is integrally formed with the casing, and the circuit plate is retained inside the grip.

13 Claims, 8 Drawing Sheets

COMPACT IMAGE READING APPARATUS WITH CIRCUIT PLATE IN RAISED PORTION OF CASING

BACKGROUND OF THE INVENTION AND RELATED ART STATEMENT

The present invention relates to an image reading apparatus such that a material or manuscript to be read is placed under or above the apparatus, and an image on the manuscript is read by reciprocally operating a reading mechanism.

Generally, the image reading apparatus is provided with a reading section having an optical system for reading an image on a manuscript, a reciprocally moving mechanism for reciprocally moving the reading section for operating or scanning the reading section, a power source, and a control or circuit plate for controlling the entire apparatus.

In the conventional apparatus, as shown in FIGS. 12(A)–12(C), a casing 25 designed to be placed above a manuscript is provided with a reading window 27A at a lower portion thereof, and a watching or checking window 27B at an upper portion thereof, through which the manuscript under the reading window 27A is seen. Also, in the casing, a reading section 21, a power source 22 with a motor, a reciprocally moving section 23 and a control or circuit plate 24 are arranged almost on the same level. Further, a handle or grip 26 is formed to project outwardly at a rear outer portion of the casing 25.

In this apparatus, the reading section 21 moves or reciprocates along the reading window 27A between the reading window 27A and the watching window 27B. Since the control plate 24 can not be formed at the reading window 27A or the watching window 27B, because it prevents movement and reading of the reading section 21. Therefore, the control plate 24 is provided at an area laterally adjacent a moving area of the reading section 21. As a result, a whole bottom area of the apparatus becomes large, which eventually covers a large area of the manuscript. Therefore, the conventional apparatus can not be easily manipulated.

The apparatus as shown in FIGS. 12(A)–12(C) is used in association with a personal computer, to which a specific circuit plate with interface is attached. Therefore, the circuit plate 24 may be made small, so that the circuit plate 24 can be easily installed inside the casing 25. However, in case the image reading apparatus is directly connected to a personal computer, the apparatus must have interface inside thereof, so that the apparatus needs space to install interface inside of the apparatus.

Further, since the conventional apparatus is formed with the grip 26 to project outwardly from the outer surface of the casing 25, the apparatus is not easily carried, and it is not easy for handling of the apparatus, such as locating the apparatus precisely above a manuscript.

The problems, such as it requires large bottom area and difficulty in handling, occur not only in the image reading apparatus with the reading window and the watching window as shown in FIGS. 12(A)–12(C), but also in an image reading apparatus having an image setting surface on which a manuscript is placed, a reading section thereof reciprocating under the image setting surface to read the image.

Accordingly, one object of the present invention is to provide an image reading apparatus, wherein a whole bottom area of the apparatus is made small to minimize the apparatus.

Another object of the invention is to provide an image reading apparatus as stated above, in which a grip of the apparatus is formed to be easily carried.

Further objects and advantages of the invention will be apparent from the following description of the invention.

SUMMARY OF THE INVENTION

The image reading apparatus of the invention basically comprises a casing having a reading window, a reading mechanism installed inside the casing, an actuating mechanism situated inside the casing for moving the reading mechanism along the reading window, and a circuit mechanism for controlling the reading mechanism and the actuating mechanism. The reading window is formed on one of upper and bottom portions of the casing.

When the reading window is formed in the upper portion of the casing, a material to be read is placed on the reading window. When the reading window is formed in the lower portion of the casing, a checking or watching window is formed in the upper portion of the casing. The material to be read is placed under the reading window and is seen through the checking and reading windows, so that the precise location of the image reading apparatus is adjusted relative to the image to be read.

The circuit mechanism of the present invention includes at least one circuit plate. The circuit plate is located at least one side of the casing parallel to the actuating mechanism aside the reading window. In particular, the circuit plate is located above or below a moving area of the reading mechanism.

Preferably, the casing has a raised portion near the reading window or the checking window, in which the circuit plate is installed. Therefore, the size of the apparatus in plan can be minimized. The raised portion is provided with a grip so that the apparatus can be easily held and carried.

DETAILED DESCRIPTION OF PREFERRED EMBODIMENTS

Figure 1:
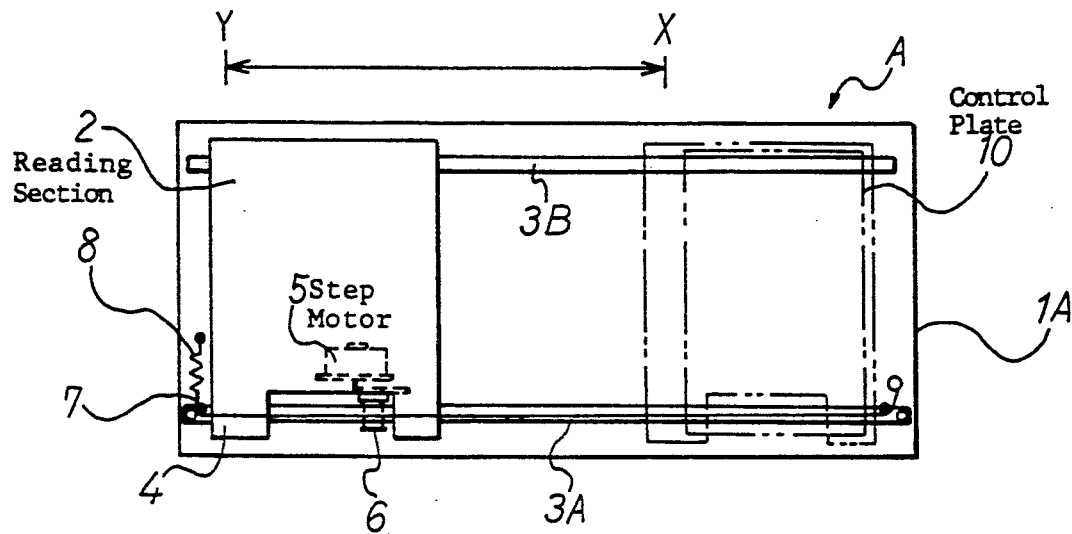
FIG. 1 is an explanatory plan view of a first embodiment of an image reading apparatus of the invention, wherein mechanisms inside the apparatus is schematically shown.
Figure 2:
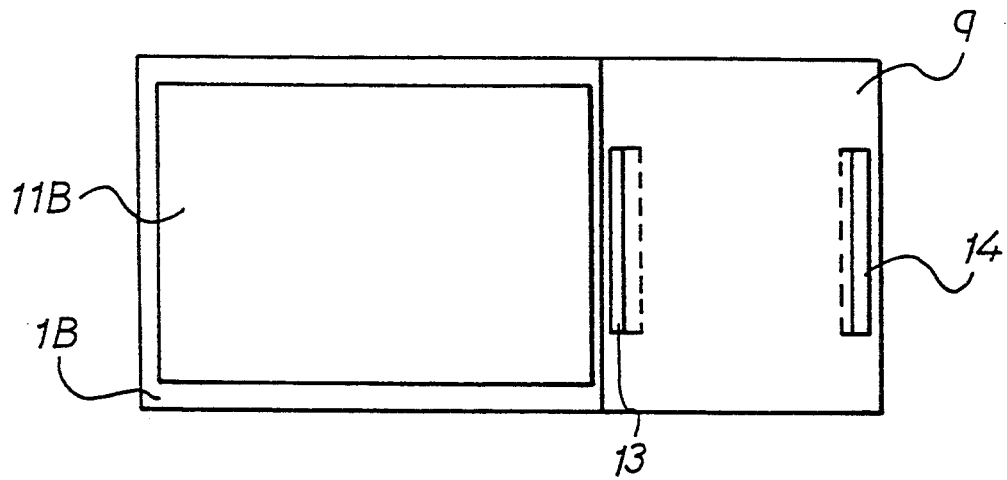
FIG. 2 is a plan view of the apparatus as shown in FIG. 1.
Figure 3:
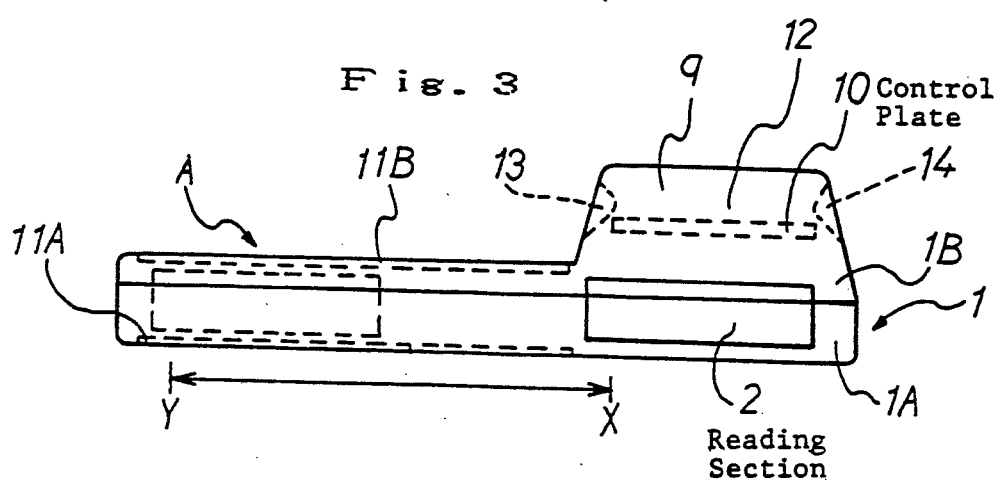
FIG. 3 is a side view of the apparatus as shown in FIG. 1.

FIGS. 1-3 show a first embodiment A of an image reading apparatus of the invention. The image reading apparatus A comprises a casing 1, and a reading section 2 situated inside the casing 1. The reading section 2 can be reciprocally moved between a waiting position X and a read starting position Y. The reading section 2 includes a plate with an optical system, such as a light source, mirror, lens and photoelectric converter, which are known already, so that they are not shown in FIGS. 1-3.

The casing 1 includes a base 1A made of a metal plate, and a cover 1B attached to the base 1A. The base 1A is provided with a reading window 11A, which is covered with a transparent material, such as a glass or acrylic resin plate.

Inside the casing 1, guide shafts 3A, 3B are situated, by which the plate of the reading section 2 is guided to reciprocate. A portion 4 of the plate of the reading section 2 is situated over the guide shaft 3A.

A step motor 5 is fixed on the plate of the reading section 2 as an actuating source, and a pulley 6 is attached to the motor 5. A wire 7 engaging the pulley 6 is installed inside the casing 1 along the guide shaft 3A. A tension spring 8 is attached between an end of the wire 7 and a part of the casing to provide a tension to the wire 7. Therefore, when the motor 5 is actuated, the pulley 6 rotates while engaging the wire 7, so that the reading section 2 with the motor 5 moves back and forth or reciprocates along the guide shafts 3A, 3B.

The guide shafts 3A, 3B, the portion 4 of the reading section 2, the pulley 6, the wire 7 and the tension spring 8 form a reciprocally moving or actuating mechanism.

The cover 1B is made of a plastic material and is attached to the base 1A. The cover 1B is provided with a grip 9 at one upper side thereof, in which a retaining portion 12 is formed. A control plate 10 for controlling the optical system and the reciprocally moving mechanism is retained in the retaining portion 12. The grip 9 includes finger grooves 13, 14 perpendicular to the longitudinal direction of the casing.

On an upper portion of the cover 1B, a watching or checking window 11B is formed for watching the reading window 11A. The checking window 11B is also made of a transparent material.

In the apparatus A, when operated, the apparatus is placed on a manuscript by holding the grip 9. Then, a user watches the manuscript through the checking window 11B and the reading window 11A to see or review a portion of the manuscript to be read.

Then, the motor 5 is actuated to rotate the pulley 6 along the wire 7. Accordingly, the reading section 2 is moved back and forth along the guide shafts 3A, 3B to allow the reading section 2 to read images on the manuscript. Namely, when the apparatus is actuated, the plate of the reading section 2 is moved from the waiting position X to the read starting position Y. While the plate of the reading section 2 returns from the read starting position Y to the waiting position X, the reading section 2 reads the images on the manuscript.

In the apparatus A, the control plate 10 is situated adjacent to the checking window 11B above a moving area of the reading section 2. Namely, the casing 1 is raised or extended upwardly near the watching window 11B to have a space for retaining the control plate 10. Therefore, it is possible to minimize a floor area or bottom size of the apparatus.

Also, the raised portion of the cover 1B constitutes the grip 9. Since the grip 9 is formed at an upper portion of the apparatus A, it is easy to carry and handle the apparatus A. Further, since the finger grooves 13, 14 are formed perpendicular to the moving direction of the reading section 2, the finger grooves 13, 14 can be made long to facilitate the handling of the apparatus A. A large control plate 12 may be installed inside the grip 9 as well.

Further, since the waiting position X for the reading section 2 is located under the grip 9, weight of the reading section 2 is directed under the grip 9. Therefore, the balance of the apparatus A is good to be carried easily.

Now, the second embodiment B of the present invention is explained with reference to FIGS. 4-9.

Figure 4:
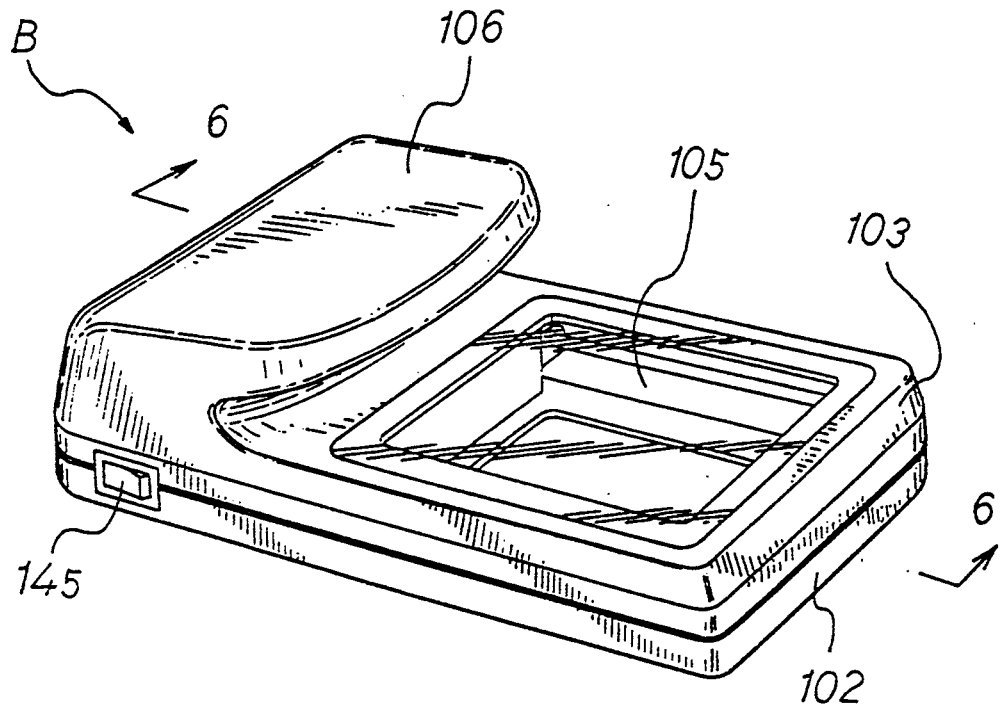
FIG. 4 is an upper perspective view of a second embodiment of an image reading apparatus of the invention.
Figure 5:
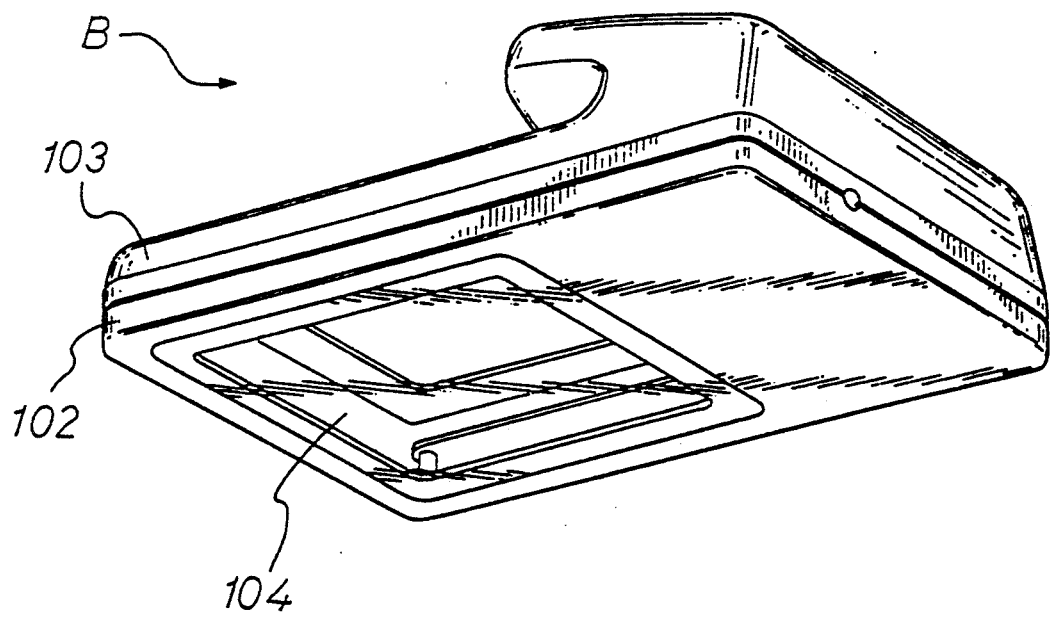
FIG. 5 is a lower perspective view of the apparatus as shown in FIG. 4.

FIGS. 4 and 5 are perspective views of the image reading apparatus B, which is designed to be connected to a personal computer or a word processor by a cable (not shown). Namely, the image reading apparatus B is placed on a manuscript to read an image of the manuscript, and the image is transferred to the personal computer.

The image reading apparatus B includes a lower cover or casing 102, and an upper cover or casing 103. The lower cover 102 is provided with a reading window 104 formed of a transparent material, such as glass or acrylic resin plate, and a power switch 145.

The upper cover 103 includes a watching or checking window 105 for checking a manuscript placed under the reading window 104, and a grip 106 for carrying the image reading apparatus B. The checking window 105 is formed of a transparent material as in the reading window 104.

Inside the image reading apparatus B, a reading section 107 is formed. The reading section 107 reads an image while moving between the reading window 104 and the checking window 105 along the reading window 104.

Figure 6:
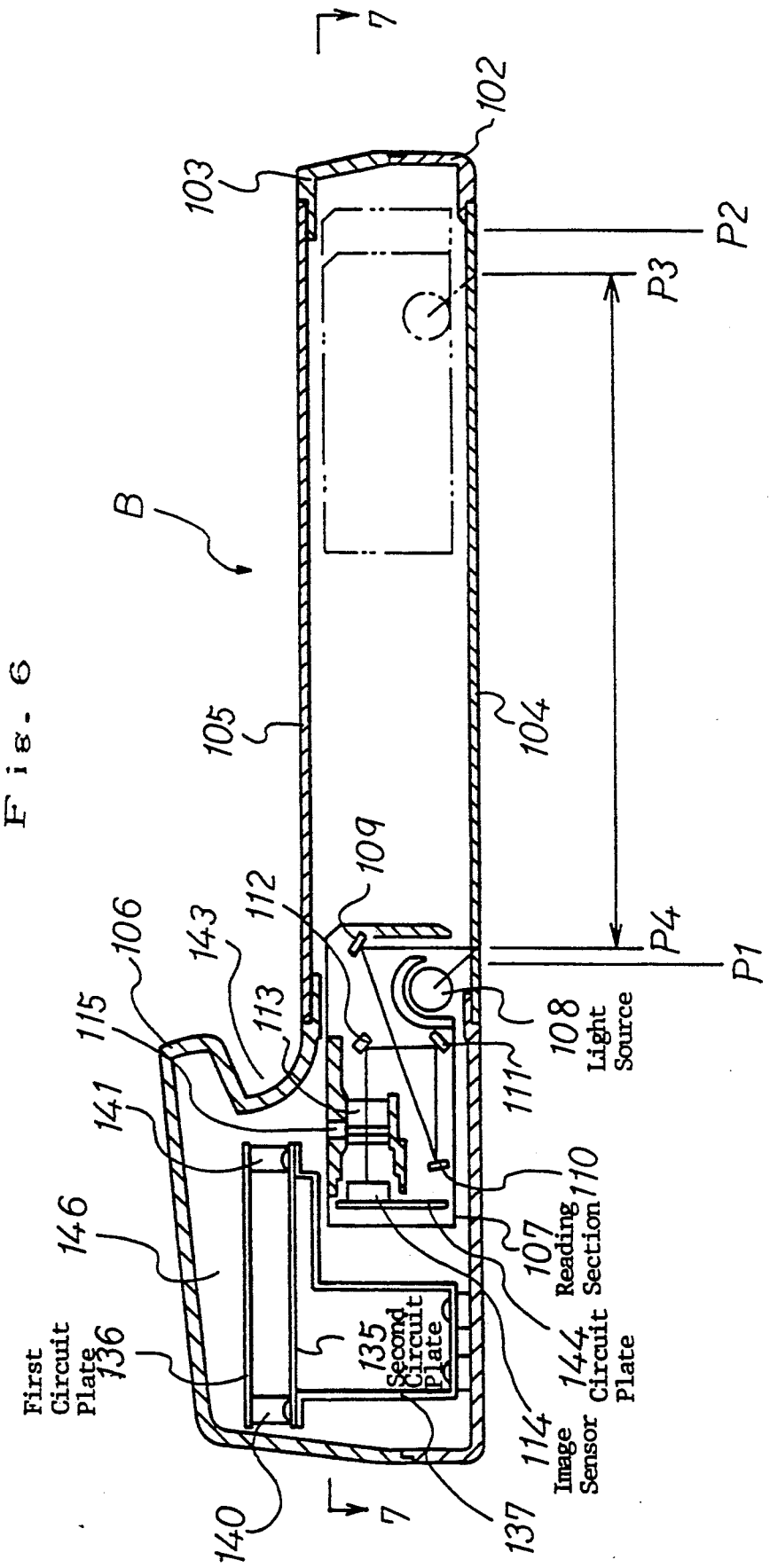
FIG. 6 is an enlarged explanatory section view taken along line 6—6 in FIG. 4.

As shown in FIG. 6, attached to the reading section 107 are a light source 108, such as a fluorescent lamp, mirrors 109, 110, 111, 112, a lens 113, an image sensor 114, such a photoelectric converter like CCD, and a circuit plate 144, to which the image sensor 114 is attached. The reading section 107 is covered so that light does not enter thereinto.

In the reading section 107, the mirrors 110, 111 are arranged under the lens 113 and the image sensor 114. Therefore, position of the lens 113 can be adjusted through a hole 115 formed at an upper portion of the reading section 107.

Figure 9:
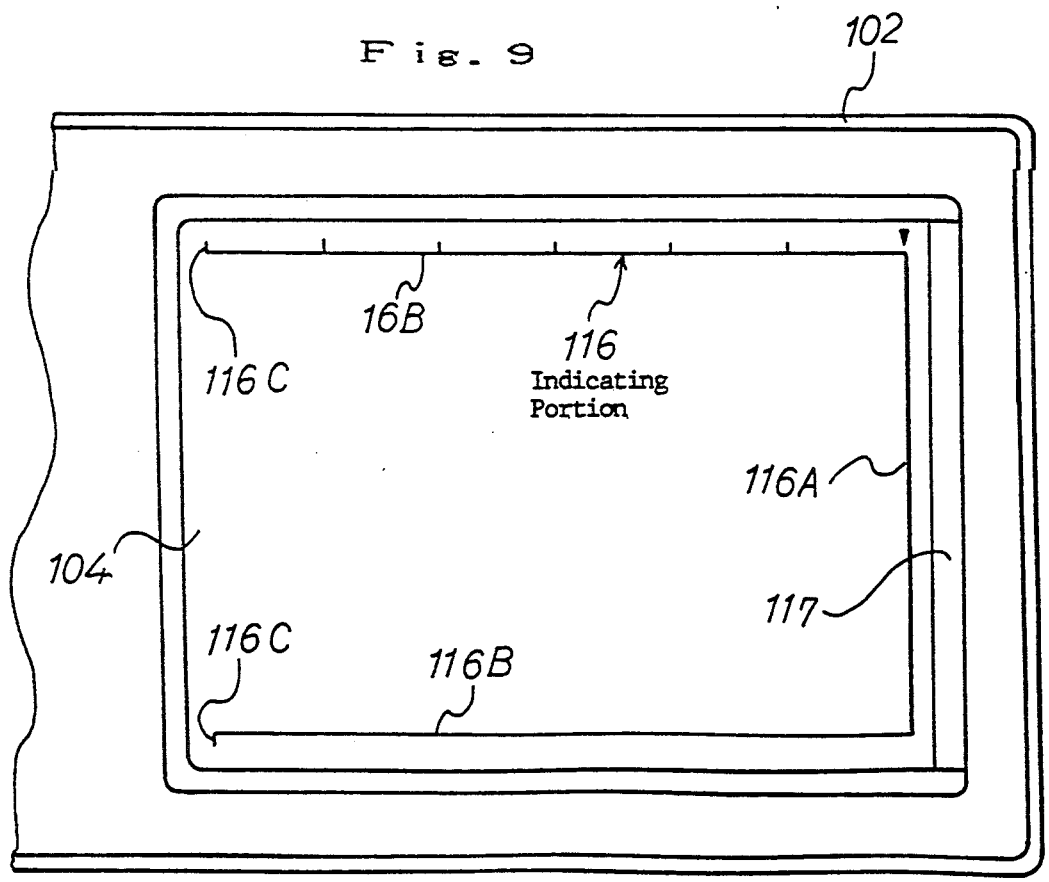
FIG. 9 is an enlarged view for showing an inner structure of a reading window.

As shown in FIG. 9, an indicating portion 116 is printed inside the reading window by, for example a silk-screen printing. The indicating portion 116 includes a portion 116A for indicating a read starting position in the secondary scanning direction, a portion 116B for indicating a reading area in the main scanning direction, and a portion 116C for indicating a read finishing position, which surround the reading window 104 at three sides.

Incidentally, the portion 116C at the read finishing position does not enter inside a reading area, and extends outwardly from the reading area. Also, inside the reading window 104, a white standard surface 117 is formed by silk-screen printing or a white tape.

Figure 7:
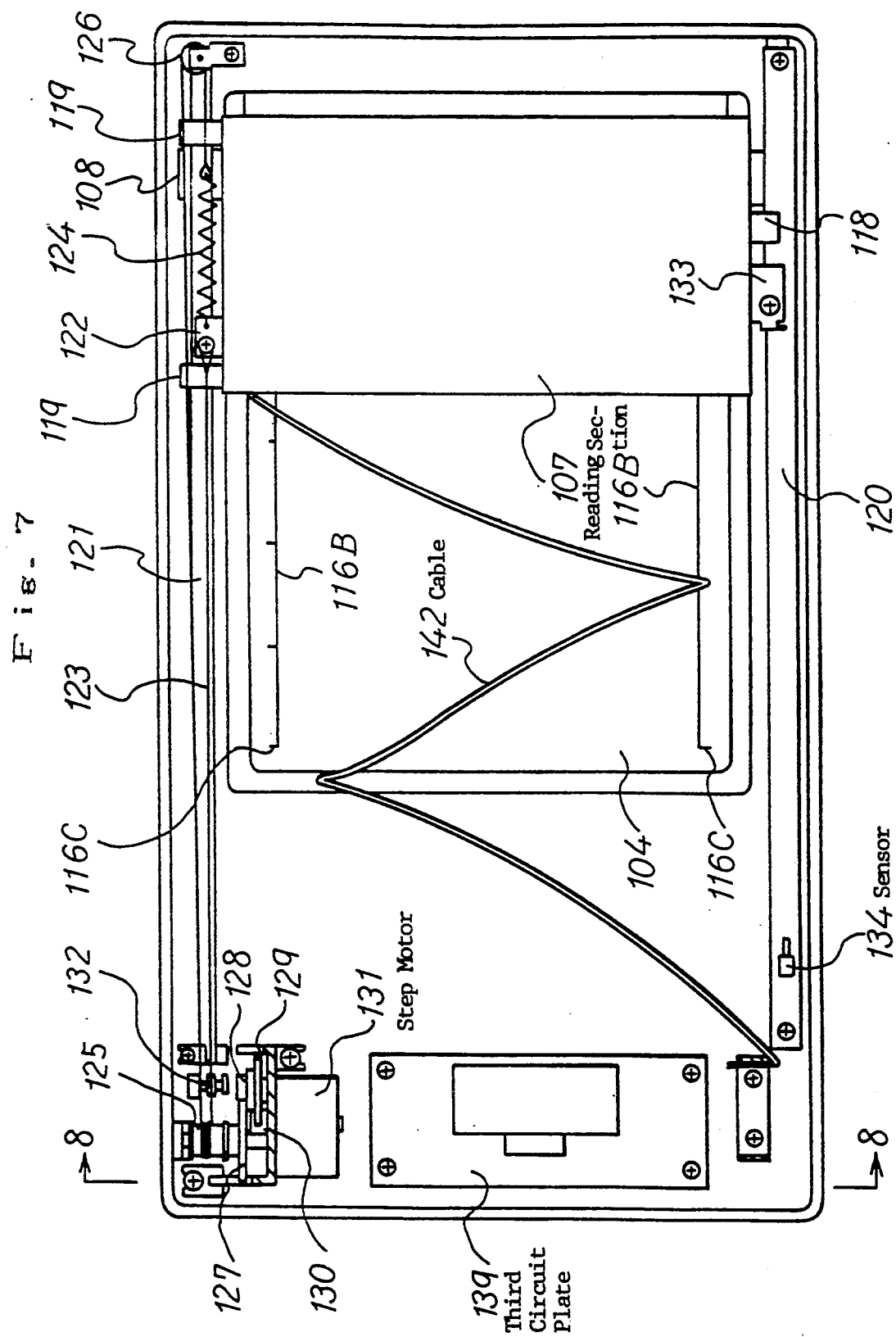
FIG. 7 is an explanatory section view taken along line 7—7 in FIG. 6.
Figure 8:
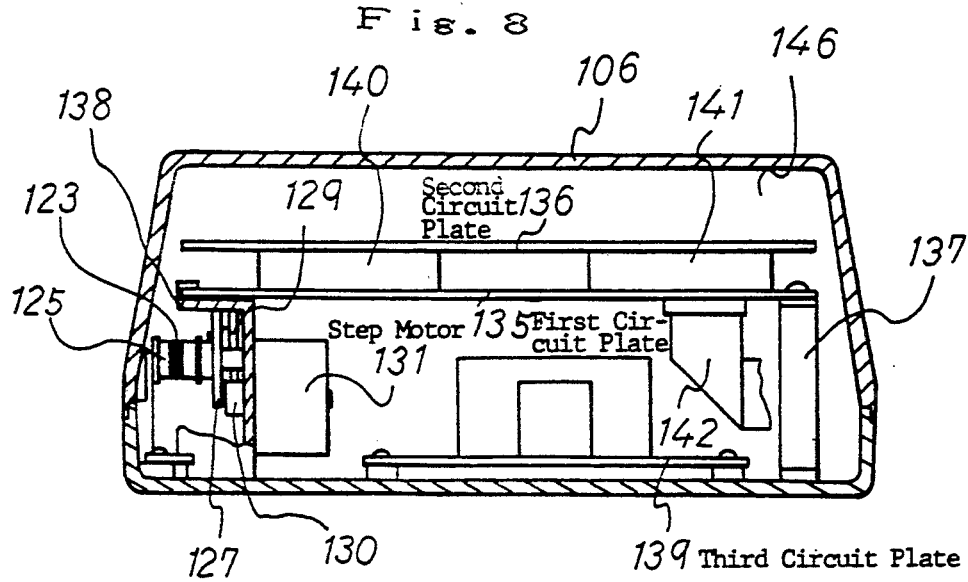
FIG. 8 is an explanatory section view taken along line 8—8 in FIG. 7.

As shown in FIG. 7, the reading section 107 includes, at both sides thereof, supporting members 118, 119 and a connecting portion 122. The supporting member 118 is placed on a guide rail 120 through a sliding sheet, while a guide rod 121 is slidably inserted into the supporting members 119.

A wire 123 is installed inside the lower cover 102 along the guide rod 121. One end of the wire 123 is attached through a spring 124 to the connecting portion 122, and the other end of the wire 123 is connected directly to the connecting portion 122. The wire 123 is wound around pulleys 125, 126. The pulley 125 is connected to a step motor 131 through gears 127, 128, 129, 130. The pulley 126 is attached to the lower cover 102 to incline at some angle. Also, the wire 123 is supported between the pulleys 125, 126 by a tension pulley 132.

When the motor 131 is actuated, the pulley 125 rotates, so that the reading section 107 moves back and forth between the waiting position and the read starting position.

Further, the reading section 107 is provided with a projection 133, and a sensor 134 is formed on the guide rail 120 actuated by the projection 133. When the projection 133 pushes the sensor 134, it means that the reading section 107 is moved to a waiting position.

The grip 106 is provided with a finger groove 143, and a retaining portion 146 is formed inside the grip 106. First and second circuit plates 135, 136 are supported on support members 137, 138 and are situated in the retaining portion 146 inside the grip 106. A third circuit plate 139 for a power circuit is situated under the support members.

The first and second circuit plates 135, 136 control the reading section 107 and the motor 131, and communicate with a personal computer. The first and second circuit plates 135, 136 are spaced apart from each other, but are connected together by means of connectors 140, 141. When the reading section 107 is in the waiting position, the first and second circuit plates 135, 136 are located above the reading section 107. Also, the reading section 107 is connected to the first circuit plate 135 through a plurality of bent flat cable 142, which is shown in FIG. 7.

As shown in FIG. 6, when the power switch 145 is turned on, the reading section 107 is moved to a waiting position P1, wherein the sensor 134 is turned on. In this condition, when an image on a manuscript is to be read, the apparatus B is carried by the grip 106 and is placed on the manuscript. Then, the apparatus B is moved or adjusted by watching the image through the checking window 105 and the reading window 104 so that the image to be read is located within the indicating portion 116.

After the image to be read is placed in a proper position, a start switch in a personal computer (not shown) is actuated. As a result, the reading section 107 is moved by the motor to a position P2, at which white standard surface is placed.

In particular, in this kind of image reading apparatus B, even if the darkness of the manuscript is the same, the same photoelectric output may not be obtained in respective image elements in the main scanning direction because of changes of the darkness of the light source in the main scanning direction. Therefore, in order to compensate the change of the photoelectric output or shading, a white standard image is read by the reading section before operation of the apparatus to find in advance the changes of the image elements, and after reading the image elements in operation, the output thus read is adjusted in accordance with the data of the change of the photoelectric output before operation.

In the image reading apparatus B, the white standard surface is formed inside the reading window 104 instead of forming the white standard surface outside. Therefore, before starting to read the image, the reading section 107 is moved to the position P2 to read the white standard surface. At this position, the reading section 107 reads the white standard surface, and output thereof is transferred outside.

Then, the motor 131 is turned in a reverse direction to move the reading section 107 to a read starting position P3, from which the reading section 107 is moved at a constant speed to a read finishing position P4. Namely, reading of the manuscript in the secondary scanning direction is started. The reading section 107, while moving one line in a secondary scanning direction, operates such that reflexed light from the manuscript is focused on the image sensor 114 in each image element in the main scanning direction. The output for the light image thus obtained is transferred to the personal computer as image signals.

In the personal computer, the image signals from the reading section 107 are adjusted based on the information at the time of reading the white standard surface, and are displayed as required.

When the motor 131 is rotated at a predetermined number (when the motor 131 is a pulse motor, number of pulse is counted), an opening of the light source 108 of the reading section 107 comes to the read finishing position. Accordingly, reading is completed.

The reading section 107, however, is further moved so that the projection 133 of the reading section 107 abuts against the sensor 134. When the projection 133 pushes the sensor 134, the sensor 134 is activated to indicate that the reading section 107 is moved to the waiting position. The signal from the sensor 134 is transmitted to a control section, and the motor 131 is stopped. In this condition, the reading section 107 waits for a next reading.

In the apparatus B, the circuit plates 135, 136 are positioned adjacent to the checking window 105 above the moving area of the reading section 107. Namely, the upper cover 103 projects outwardly adjacent to the checking window 105 to have the retaining portion 146 for receiving the circuit plates 135, 136. Therefore, the bottom space of the casing can be minimized, and the space for retaining the circuit plates 135, 136 is obtained.

Also, since the circuit plates 135, 136 are located above the waiting position of the reading section 107, there is a space under the circuit plates 135, 136 to thereby facilitate radiation of heat from the circuit plates 135, 136. Also, a large or tall member may be installed under the circuit plates 135, 136 adjacent the waiting position of the reading section 107. Namely, a space is effectively utilized.

Further, the projecting portion or the outside of the retaining portion 146 includes the grip 106 at the side of the checking window 105. Namely, the grip 106 is located at an outer surface of the upper cover 103. Therefore, the apparatus B can be carried easily. Also, the location of the apparatus B can be adjusted easily. The apparatus B has other advantages as in the apparatus A.

Figure 10A:
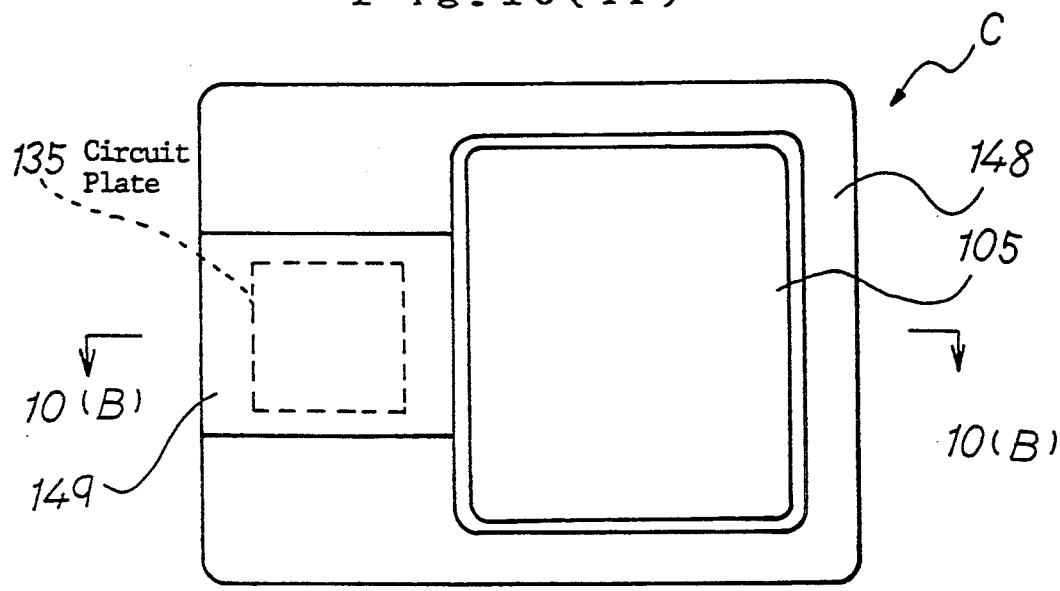
FIG. 10(A) is an explanatory plan view of a third embodiment of the image reading apparatus of the invention.
Figure 10B:
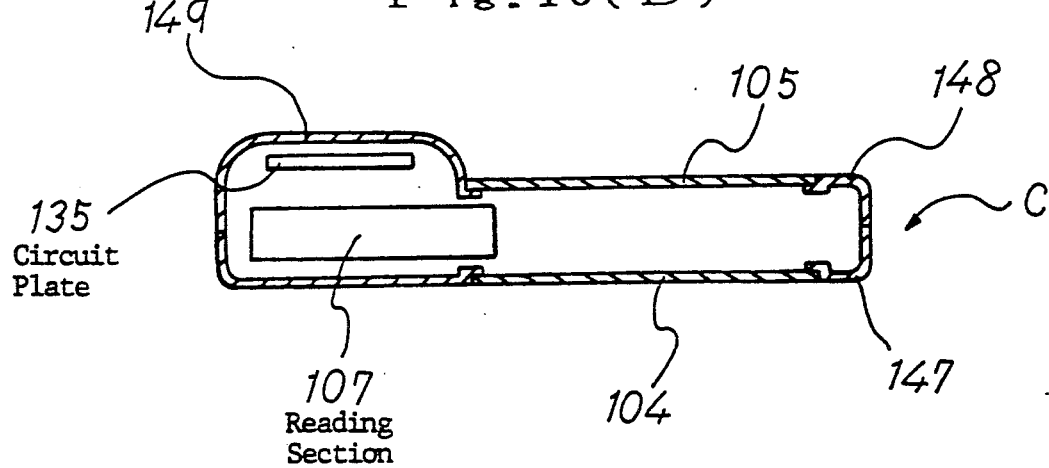
FIG. 10(B) is an explanatory section view taken along line 10(B)—10(B) in FIG. 10(A)

FIGS. 10(A), 10(B) show a third embodiment C of the image reading apparatus of the invention. The image reading apparatus C includes the reading section 107, a mechanism for moving the reading section 107, and the circuit plate 135, as in the apparatus B. However, the image reading apparatus C further includes a lower cover 147 with a reading window 104, and an upper cover 148 with a checking window 105. The upper cover 148 is provided with a grip 149 extending in the same direction as in the moving direction of the reading section 107.

Namely, in the apparatus A and B, the grip is formed perpendicular to the moving direction of the reading section, but in the apparatus C, the grip is formed parallel to the moving direction of the reading section. The circuit plate 135 is retained inside the grip 149. The apparatus C operates as in the apparatus A and B.

Figure 11A:
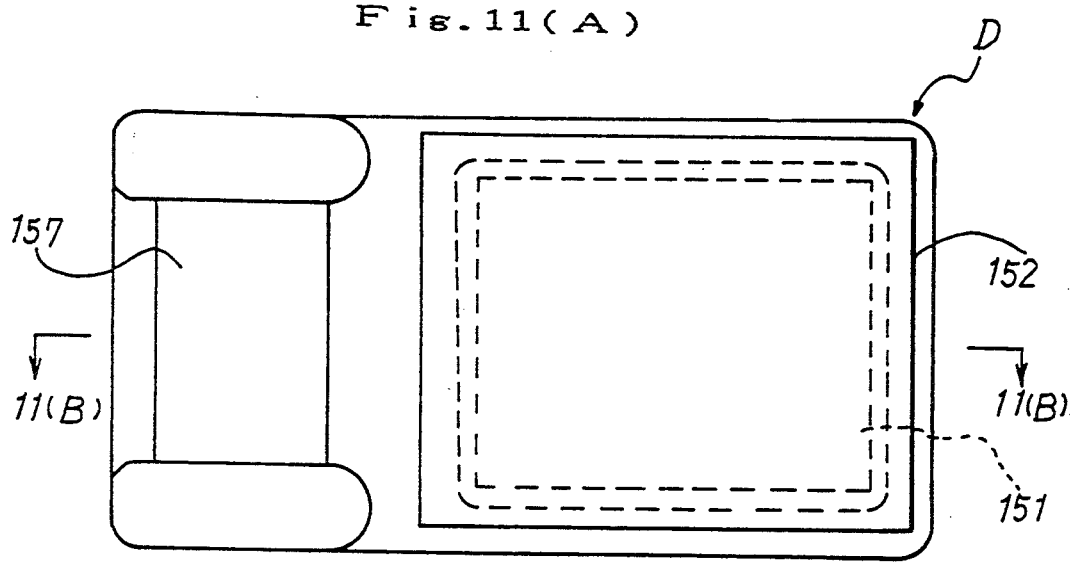
FIG. 11(A) is an explanatory plan view of a fourth embodiment of the image reading apparatus of the invention.
Figure 11B:
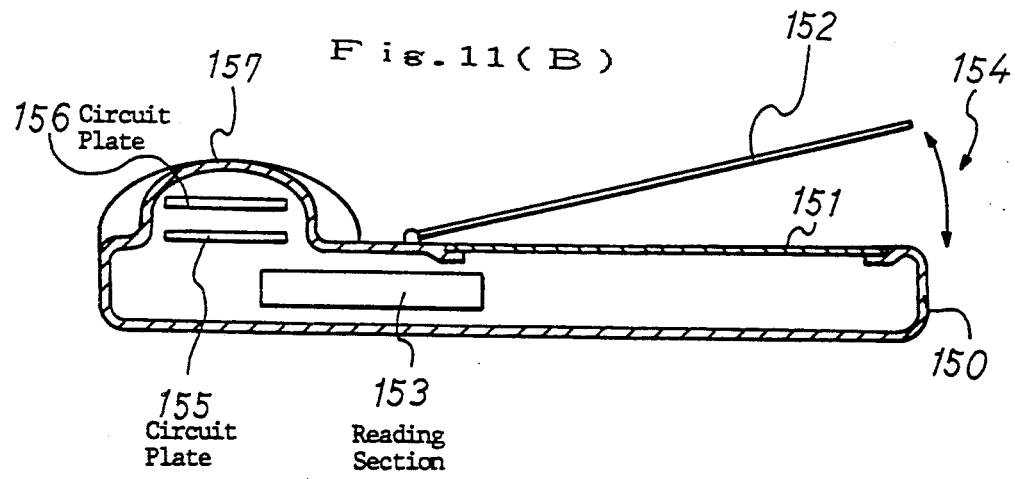
FIG. 11(B) is an explanatory section view taken along line 11(B)—11(B) in FIG. 11(A)
Figure 12A:
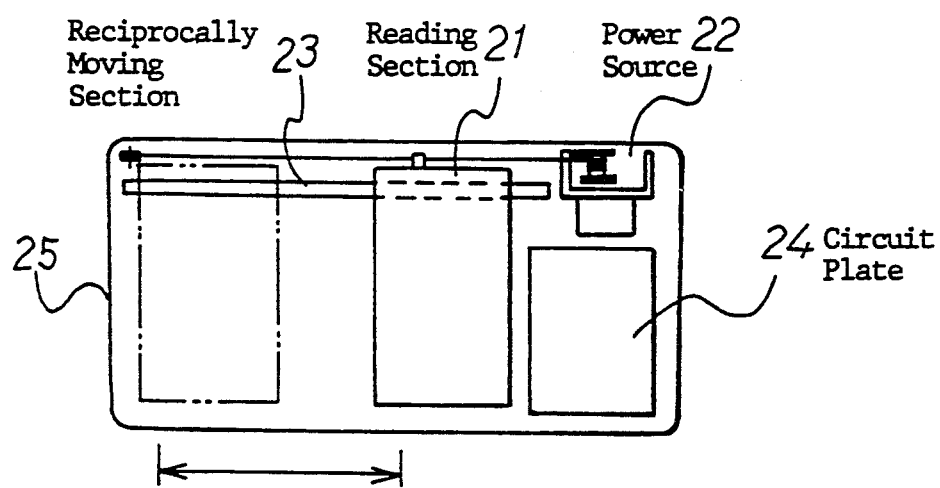
FIG. 12(A) is an explanatory plan view for showing an inner structure of a conventional image reading apparatus.
Figure 12B:
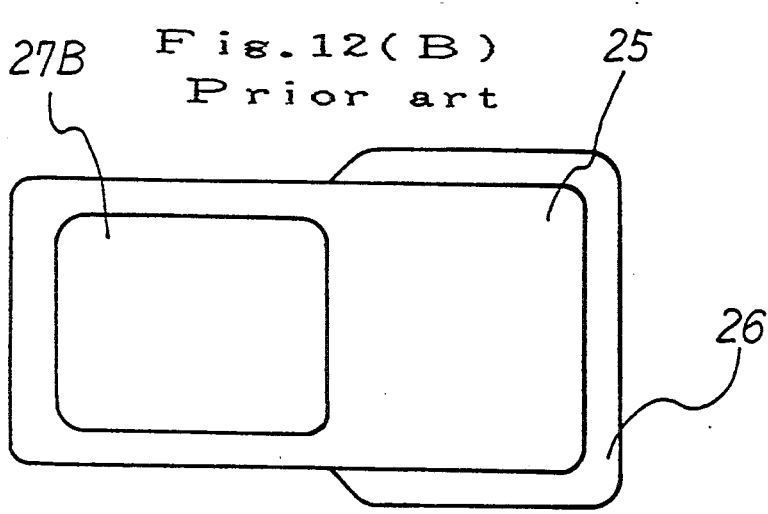
FIG. 12(B) is an explanatory plan view of a conventional image reading apparatus as shown in FIG. 12(A)
Figure 12C:
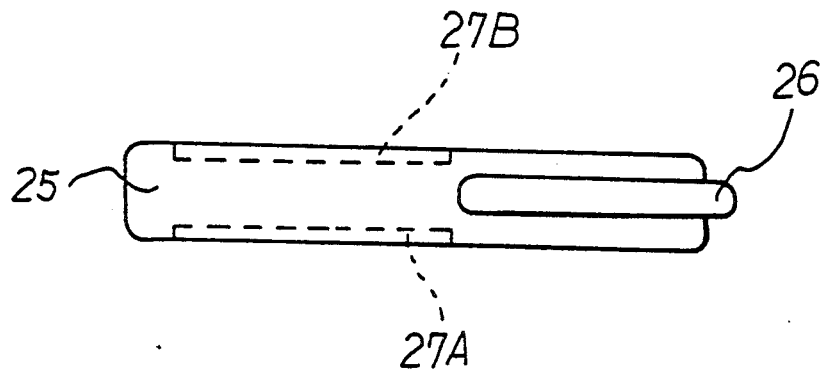
FIG. 12(C) is an explanatory side view of a conventional image reading apparatus as shown in FIG. 12(A).

FIGS. 11(A), 11(B) show a fourth embodiment D of the image reading apparatus of the invention. In the apparatus D, a casing 150 is provided with a reading window or a manuscript setting portion 151 at an upper portion of the casing 150. A cover 152 is attached to the casing 150 to close the reading window 151. Inside the casing, a reading section 153 similar to the reading section 107, a mechanism for moving the reading section 153, and circuit plates 155, 156 are arranged, similar to the apparatus B.

In the apparatus D, a grip 157 is formed adjacent to the cover 152, and the circuit plates 155, 156 are retained inside the grip 157 above a moving area of the reading section 153. In the apparatus D, a manuscript is placed above the reading section 153, but the apparatus D operates as in the apparatus A and B.

In the image reading apparatus of the present invention, a grip is formed at an upper portion of a casing. By holding the grip, the apparatus can be carried and moved easily. Further, a space is formed inside the grip to retain at least one circuit plate therein above a moving area of a reading section. Therefore, the circuit plate need not be located next to the reading section on the same level. The bottom size of the apparatus can, therefore, be minimized. In the present invention, a compact image reading apparatus, which can be carried easily, is obtained.

While the invention has been explained with reference to the specific embodiments of the invention, the explanation is illustrative and the invention is limited only by the appended claims.

What is claimed is:

1. An image reading apparatus, comprising:
   a casing having upper and bottom portions, a reading window formed in the bottom portion and adapted to be placed over a material with an image to be read, a checking window formed in the upper portion above the reading window for checking a location of the reading window placed over the image to be read, and a raised portion formed on the upper portion near the checking window to project upwardly in a direction away from the checking window, said raised portion having a space therein and a grip for holding the casing,
   a reading mechanism situated inside the casing, said reading mechanism reading the image on the material through the reading window,
   an actuating mechanism situated inside the casing, said actuating mechanism moving the reading mechanism along the reading window, and
   a circuit mechanism for controlling the reading mechanism and the actuating mechanism, said circuit mechanism being situated inside the casing and having at least one circuit plate, said circuit plate being located above a moving area of the reading mechanism and inside the space of the raised portion to thereby minimize the size of the image reading apparatus.

2. An image reading apparatus according to claim 1, wherein said grip is provided with a holding portion for fingers, said holding portion being formed at a side of the reading window.

3. An image reading apparatus according to claim 1, wherein said actuating mechanism has a waiting position for the reading mechanism, said waiting position being located at a side of the raised portion.

4. An image reading apparatus according to claim 1, wherein said actuating mechanism has a finishing position for the reading mechanism, said finishing position being located at a side of the raised portion.

5. An image reading apparatus according to claim 1, wherein said reading mechanism is positioned under at lest a part of the raised portion near the reading window outside thereof when the image reading apparatus is not actuated, said circuit plate being located inside the raised portion.

6. An image reading apparatus according to claim 1, wherein said circuit mechanism is formed of at least first and second circuit plates situated inside the casing, said first circuit plate being located inside the space of the raised portion above the moving area of the reading mechanism, and said second circuit plate being located below the first circuit plate and adjacent to the moving area of the reading mechanism.

7. An image reading apparatus, comprising:
   a casing having upper and bottom portions, a reading window formed in the upper portion, a material with an image to be read being placed over the reading window, and a raised portion formed on the upper portion near the reading window to project upwardly in a direction away from the reading window, said raised portion having a space therein and a grip for holding the casing,
   a reading mechanism situated inside the casing, said reading mechanism reading the image on the material through the reading window,
   an actuating mechanism situated inside the casing, said actuating mechanism moving the reading mechanism along the reading window, and
   a circuit mechanism for controlling the reading mechanism and the actuating mechanism, said circuit mechanism being situated inside the casing and having at least one circuit plate, said circuit plate being located above a moving area of the reading mechanism and inside the space of the grip to thereby minimize the size of the reading apparatus.

8. An image reading apparatus according to claim 7, wherein said grip is provided with a holding portion for fingers, said holding portion being formed at a side of the reading window.

9. An image reading apparatus according to claim 7, wherein said actuating mechanism has a waiting position for the reading mechanism, said waiting position being located at a side of the raised portion.

10. An image reading apparatus according to claim 7, wherein said actuating mechanism has a finishing position for the reading mechanism, said finishing position being located at a side of the raised portion.

11. An image reading apparatus according to claim 7, wherein said reading mechanism is positioned under at lest a part of the raised portion near the reading window outside thereof when the image reading apparatus is not actuated, said circuit plate being located inside the raised portion.

12. An image reading apparatus according to claim 7, wherein said circuit mechanism is formed of at least first and second circuit plates situated inside the casing, said first circuit plate being located inside the space of the raised portion above the moving area of the reading mechanism, and said second circuit plate being located below the first circuit plate and adjacent to the moving area of the reading mechanism.

13. An image reading apparatus, comprising:

a casing having upper and bottom portions, a reading window formed in the bottom portion and adapted to be placed over a material with an image to be read, a checking window formed in the upper portion above the reading window for checking a location of the reading window placed over the image to be read, and a raised portion formed on the upper portion next to the checking window to project upwardly in a direction away from the checking window, said raised portion having a space therein and a grip for holding the casing, a reading mechanism situated inside the casing, said reading mechanism being located under the raised portion outside the reading window when said reading mechanism is not actuated, said reading mechanism moving between the reading and checking windows and reading the image on the material through the reading window when actuated, an actuating mechanism situated inside the casing, said actuating mechanism moving the reading mechanism from a position under the raised portion to pass along the reading window when the reading mechanism is actuated, and a circuit mechanism for controlling the reading mechanism and the actuating mechanism, said circuit mechanism having at least one circuit plate located inside the space of the raised portion and above the reading mechanism so that the casing need not have a special space for the circuit mechanism in a lateral direction to thereby minimize the size of the image reading apparatus in the lateral direction.

* * * * *